United States Patent
Subramanian et al.

(10) Patent No.: US 9,479,572 B1
(45) Date of Patent: Oct. 25, 2016

(54) DYNAMICALLY IDENTIFYING AND ASSOCIATING CONTROL PACKETS TO AN APPLICATION LAYER

(71) Applicant: Juniper Networks, Inc., Sunnyvale, CA (US)

(72) Inventors: Saravanadas P. Subramanian, San Jose, CA (US); Dhiraj D. Ballal, Santa Clara, CA (US); Kartik D. Shah, San Jose, CA (US); Prasad Chigurupati, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 146 days.

(21) Appl. No.: 14/473,660

(22) Filed: Aug. 29, 2014

(51) Int. Cl.
  *G06F 15/173* (2006.01)
  *H04L 29/08* (2006.01)
  *H04L 12/24* (2006.01)

(52) U.S. Cl.
  CPC .............. *H04L 67/10* (2013.01); *H04L 41/046* (2013.01)

(58) Field of Classification Search
  CPC . H04L 29/12; H04L 29/12207; H04L 61/20; G06F 15/173
  USPC .......................................................... 709/223
  See application file for complete search history.

(56) References Cited

U.S. PATENT DOCUMENTS

| | | | |
|---|---|---|---|
| 8,605,655 B1 | 12/2013 | Sahai et al. | |
| 2004/0249975 A1* | 12/2004 | Tuck | H04L 29/12066 709/245 |
| 2013/0007257 A1* | 1/2013 | Ramaraj | H04L 63/0263 709/224 |

* cited by examiner

*Primary Examiner* — Tauqir Hussain
(74) *Attorney, Agent, or Firm* — Harrity & Harrity, LLP

(57) ABSTRACT

A device may receive a control packet associated with a connection. The control packet may include a network address. The device may identify an application layer identifier that is associated with the network address. The device may identify a service rule associated with the application layer identifier. The service rule may identify a service to be applied to a data packet associated with the connection. The device may provide the control packet based on identifying the service rule. The control packet may be provided to permit the service to be applied to the data packet in accordance with the service rule.

20 Claims, 10 Drawing Sheets

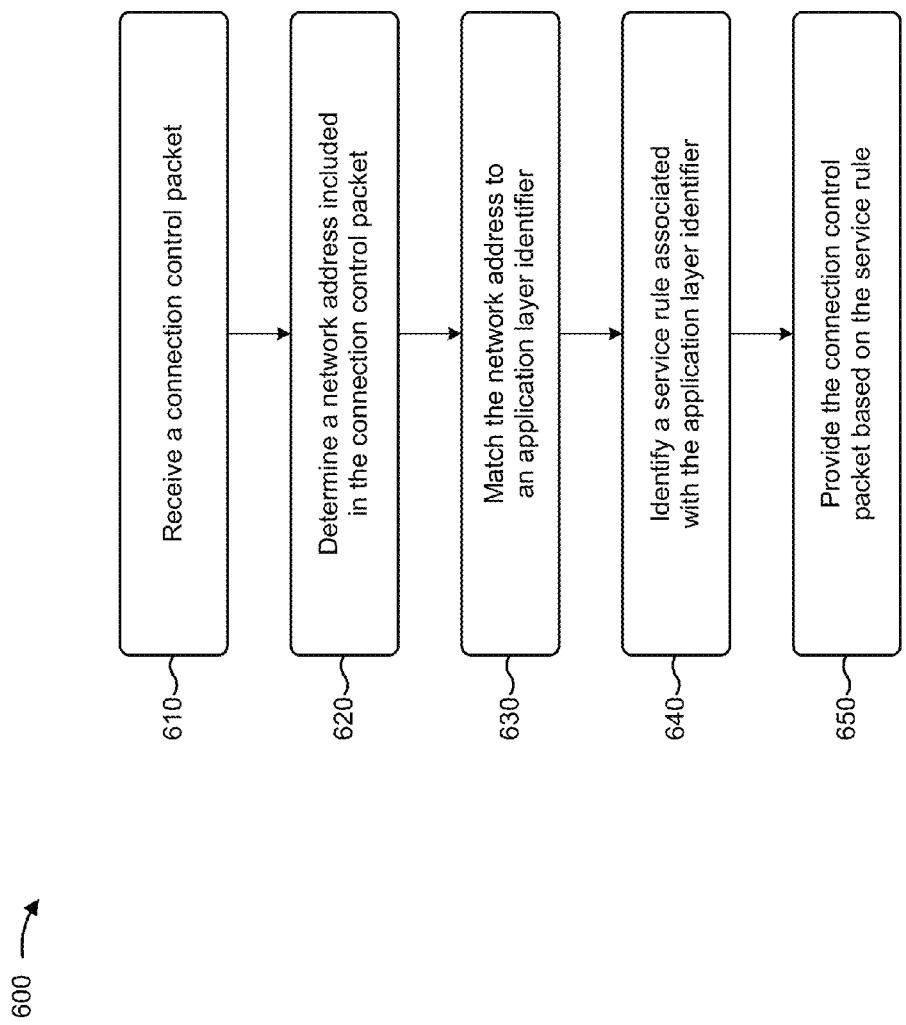

DYNAMICALLY IDENTIFYING AND ASSOCIATING CONTROL PACKETS TO AN APPLICATION LAYER

BACKGROUND

The application layer (e.g., layer 7) of the Open Systems Interconnection (OSI) model of computer networking may refer to an abstraction layer associated with communications protocols designed for process-to-process communications across an Internet Protocol (IP) computer network. Application layer protocols use the underlying transport layer protocols to establish process-to-process connections via ports.

SUMMARY

According to some possible implementations, a device may comprise one or more processors to: receive a control packet associated with a connection, where the control packet may include a network address; identify an application layer identifier that is associated with the network address; identify a service rule associated with the application layer identifier, where the service rule may identify a service to be applied to a data packet associated with the connection; and provide the control packet based on identifying the service rule, where the control packet may be provided to permit the service to be applied to the data packet in accordance with the service rule.

According to some possible implementations, a computer-readable medium may store one or more instructions that, when executed by one or more processors, cause the one or more processors to: receive a control packet associated with a connection between a first device and a second device; determine a network address included in the control packet, where the network address may identifying the second device; match the network address to an application layer identifier; identify a service rule, associated with the application layer identifier, based on matching the network address to the application layer identifier, where the service rule may identify a service to be applied to a data packet travelling via the connection between the first device and the second device; and provide the control packet based on identifying the service rule, where the control packet may be provided to allow the service to be applied to the data packet in accordance with the service rule.

According to some possible implementations, a method may include: receiving, by a device, a control packet associated with a connection, where the control packet may include a network address; identifying, by the device, an application layer identifier that is associated with the network address; identifying, by the device and based on identifying the application layer identifier that is associated with the network address, a service associated with the application layer identifier, where the service may indicate a manner in which a data packet, associated with the connection, is to be processed; and providing, by the device, the control packet based on identifying the service, where the control packet may be provided to allow the service to be applied to the data packet, associated with the connection, in accordance with the service rule.

BRIEF DESCRIPTION OF THE DRAWINGS

FIG. 6 is a flow chart of an example process for matching a network address, included in a connection control packet, to an application layer identifier, identifying a service rule associated with the application layer identifier, and providing the connection control packet based on the service rule.

DETAILED DESCRIPTION

The following detailed description of example implementations refers to the accompanying drawings. The same reference numbers in different drawings may identify the same or similar elements.

A user of a user device may wish for the user device to access a resource (e.g., a website, a program, a file, a document, etc.) hosted by a server device. The resource may be identified by an application layer identifier (e.g., a web address, a uniform resource locator (URL), a uniform resource indicator (URI), etc.). In order to access the resource, the user device may communicate with the server device by sending and/or receiving packets (e.g., via one or more devices included in a service provider network) via a connection (e.g., a transmission control protocol (TCP) connection) associated with the user device and the server device. In some cases, the user device may be connected to multiple server devices at the same time (e.g., in order to send and/or receive packets associated with accessing multiple resources).

Meanwhile, the service provider may wish for a particular service (e.g., a video caching service, a web caching service, a firewall service, a network address translation (NAT) service, a TCP optimization service, an ad insertion service, a parental control service, a web optimization service, a video optimization service, etc.) to be applied to packets associated with a particular resource and/or an application layer identifier. For example, the service provider may wish to apply a firewall service to packets associated with a first website (e.g., hosted by a first server device), may wish to apply a web caching service to packets associated with a second website (e.g., hosted by a second server), or the like. In order to achieve this, a set of service devices, associated with applying corresponding services, may require connection control packets, associated with connections corresponding to each server device. However, the connection control packets, associated with each connection, may not include the application layer information corresponding to the server device. Thus, devices included in the service provider network may be unable to associate each control packet with a corresponding connection and/or server device, and, as such, may be unable to forward the connection control packets appropriately in order to allow the service devices to apply their respective services.

Implementations described herein may allow a service control device to determine a network address, included in a connection control packet associated with a connection, and match the network address to a corresponding application layer identifier. This may allow the service control device to provide the connection control packet to a service device associated with applying a service to data packets associated with the connection.

Figure 1A:
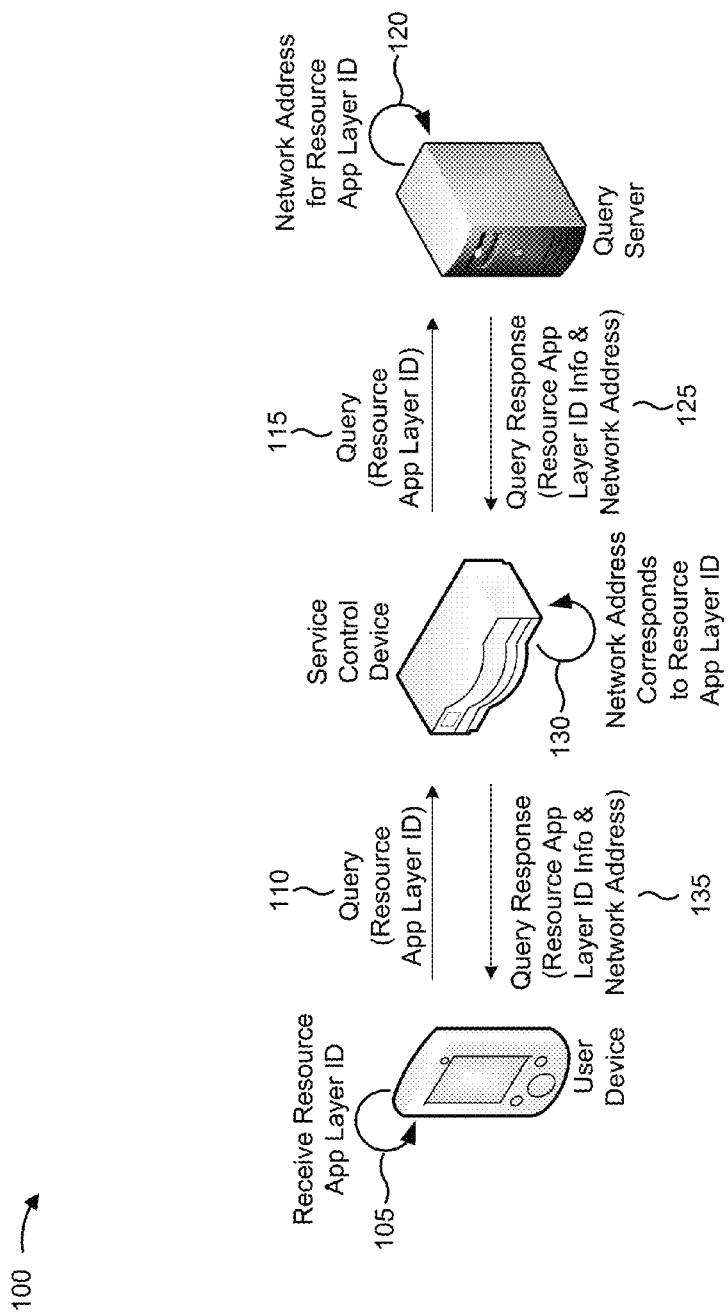
FIGS. 1A-1C are diagrams of an overview of an example implementation described herein.
Figure 1B:
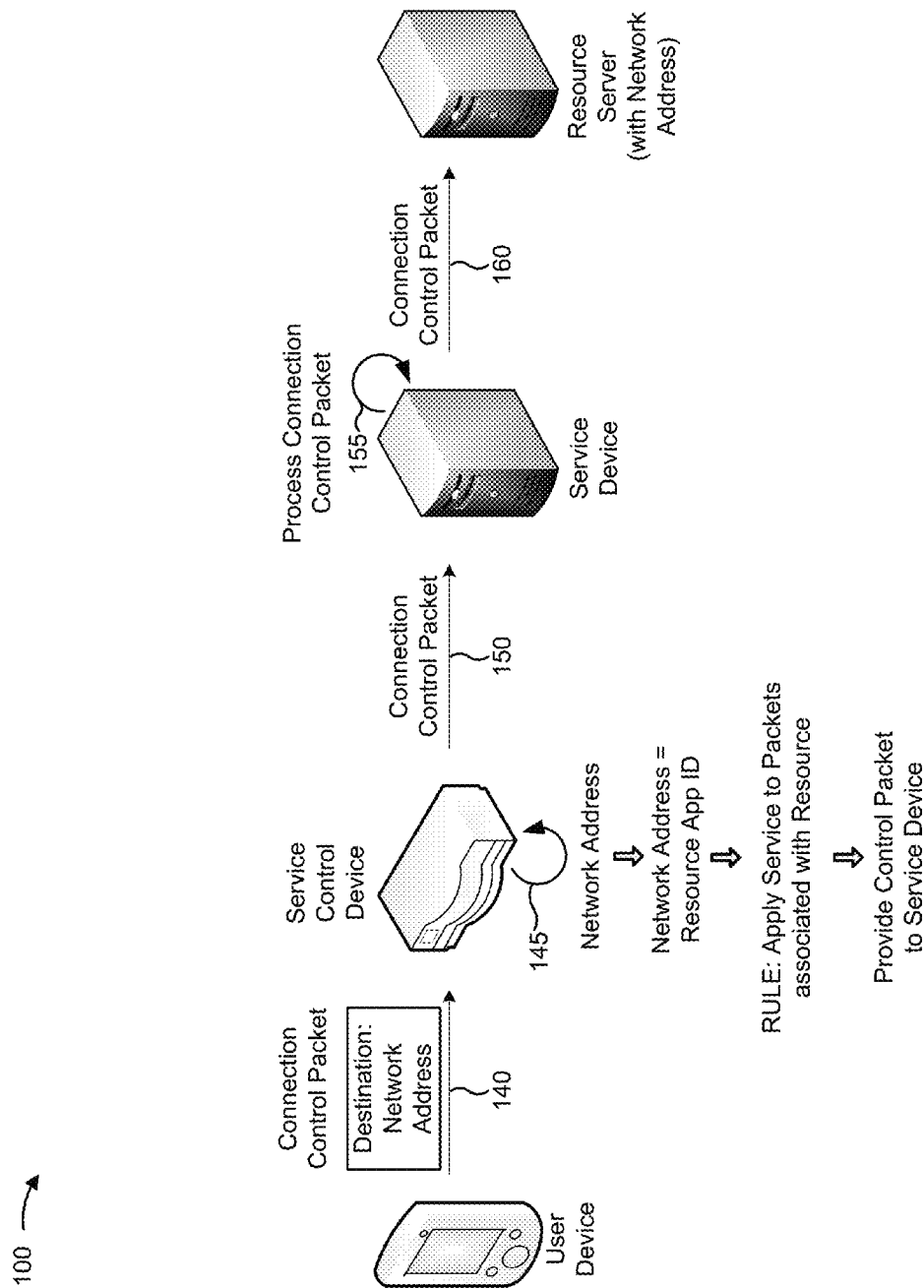
Figure 1C:
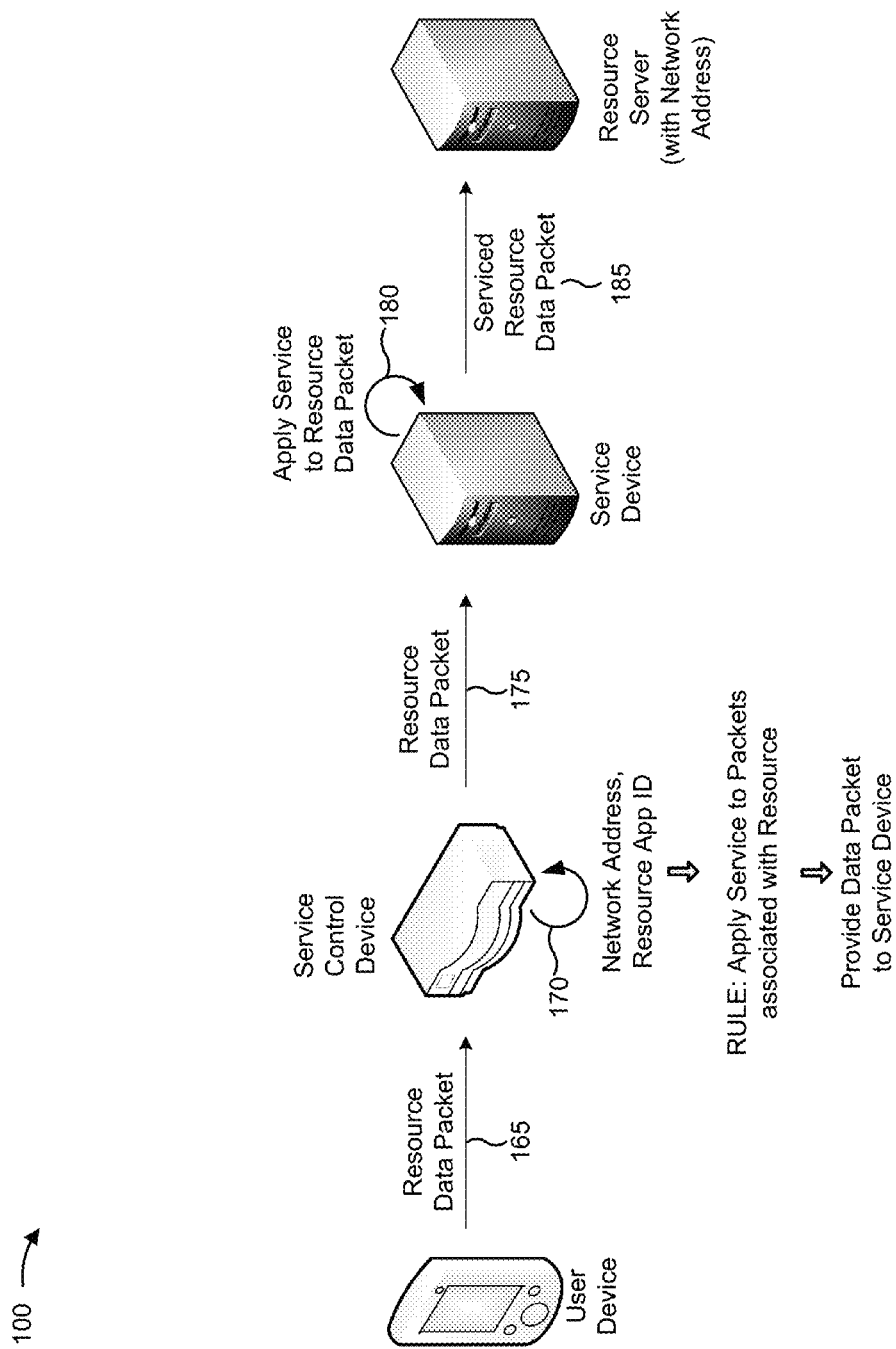

FIGS. 1A-1C are diagrams of an overview of an example implementation 100 described herein. For the purposes of example implementation 100, assume that a user of a user device wishes for the user device to access a resource identified by a particular application layer identifier.

As shown in FIG. 1A, and by reference number 105, the user device may receive the application layer identifier associated with the resource. As shown by reference number 110, the user device may generate and provide a query that includes the application layer identifier. As shown by reference number 115, a query server, associated with resolving the query, may receive the query. As shown by reference number 120, the query server may determine (e.g., based on a directory stored by the query server and based on the application layer identifier) a network address that identifies a server device that hosts the resource. As shown by reference number 125, the query server may generate and provide a query response that includes information indicating that the application layer identifier corresponds to the network address.

As shown by reference number 130, a service control device may receive the query response (e.g., assume that the service control device lies on a path between the query server and the user device), may determine (e.g., based on snooping the query response) that the network address corresponds to the application layer identifier, and may store an indication that the network address corresponds to the application layer identifier. As shown by reference number 135, the service control device may then provide the query response to the user device.

As shown in FIG. 1B, and by reference number 140, the user device may generate and provide a connection control packet, including the network address, associated with establishing a connection between the user device and the server device that hosts the resource (shown as "resource server"). Notably, the connection control packet does not include the application layer identifier.

As shown by reference number 145, the service control device may receive the connection control packet, and may determine (e.g., based on inspecting the connection control packet) the network address included in the connection control packet. As shown, the service control device may determine (e.g., based on the information stored by the service control device), that the network address corresponds to the application layer identifier associated with the resource. As further shown, the service control device may determine (e.g., based on information stored by the service control device, based on information received from a policy charging and rules function device, or the like) that a particular service is to be applied to packets associated with a connection involving any server device associated with the application layer identifier. As further shown, the service control device may identify a service device, associated with applying the particular service, to which the connection control packet is to be provided. As shown by reference number 150, the service control device may provide the connection control packet to the service device.

As shown by reference number 155, the service device may receive the connection control packet, and may process the connection control packet such that the service device may apply the particular service to data packets associated with the connection. Without processing the connection control packet, the service device may be unable to apply the particular service to the data packets associated with the connection. As shown by reference number 160, after processing the connection control packet, the service device may provide the connection control packet to the resource server that hosts the resource.

For the purposes of FIG. 1C, assume that the service control device has provided one or more other connection control packets to the service device (e.g., in the manner described above), and that the connection has been established between the user device and the server device. In other words, assume that the service device has received and processed all connection control packets associated with establishing the connection.

As shown by reference number 165, the user device may provide a data packet associated with accessing the resource. As shown by reference number 170, the service control device may receive the data packet, may determine (e.g., based on inspecting the data packet) a network address and an application layer identifier included in the data packet. As further shown, the service control device may determine, based on the application layer identifier included in the data packet, that the particular service is to be applied to data packets associated with a connection involving any server device associated with the application layer identifier. As further shown, the service control device may identify (e.g., based on the network address, and/or other information included in the data packet) the connection (e.g., between the user device and the resource server), and may determine that the service device is to apply the particular service for the connection. As shown by reference number 175, the service control device may provide the data packet to the service device (e.g., the service device to which the connection control packets were provided).

As shown by reference number 180, the service device may receive the data packet, may apply the particular service to the data packet and, as shown by reference number 185, may provide the serviced data packet to the resource server. This process may be repeated for other data packets associated with the connection such that the particular service is applied to all data packets associated with the connection between the user device and the resource server.

In this way, a service control device may determine a network address, included in a connection control packet associated with a connection, and may match the network address to a corresponding application layer identifier. This may allow the service control device to provide the connection control packet to a service device associated with applying a service to data packets associated with the connection.

Figure 2:
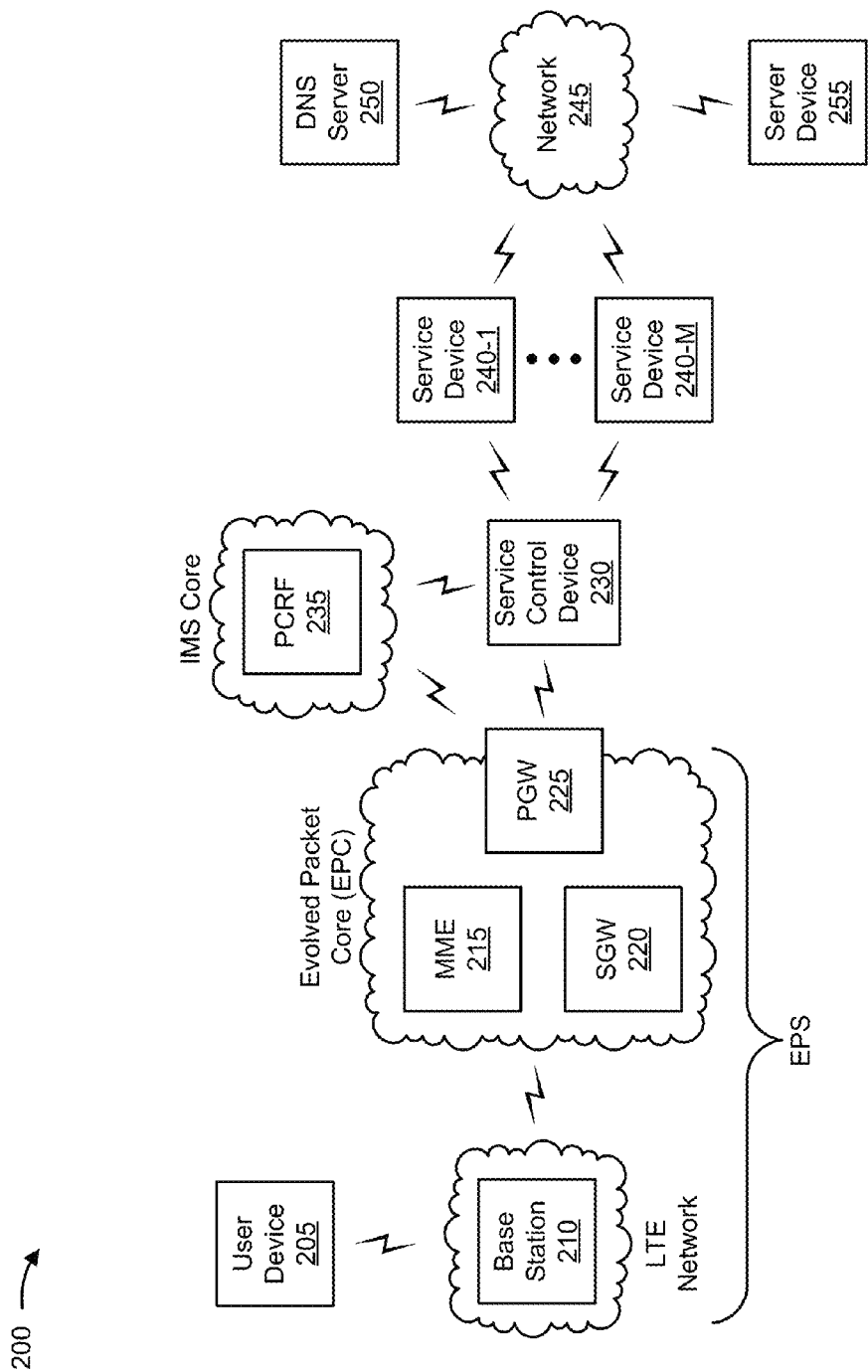
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 205, a base station 210, a mobility management entity device (MME) 215, a serving gateway (SGW) 220, a packet data network gateway (PGW) 225, a service control device 230, a policy and charging rules function server (PCRF) 235, one or more service devices 240-1 through 240-M (M≥1) (herein referred to collectively as service devices 240, and individually as service device 240), a network 245, a domain name system (DNS) server 250, and a server device 255. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which user devices 205 communicate with the EPC. The EPC may include MME 215, SGW 220, and/or PGW 225 that enable user devices 205 to communicate with network 245 and/or an Internet protocol (IP) multimedia subsystem (IMS) core. The IMS core may include PCRF 235. Alternatively, PCRF 235 may reside in the EPC.

User device 205 may include a device capable of receiving, generating, storing, processing, and/or providing information associated with accessing a resource (e.g., a website, a program, a file, a document, etc.) hosted by server device 255. For example, user device 205 may include a communications and/or computing device, such as a mobile phone (e.g., a smart phone, a radiotelephone, etc.), a laptop computer, a tablet computer, a handheld computer, a gaming device, or a similar device. In some implementations, user device 205 may be capable of communicating via a connection, between user device 205 and server device 255, associated with accessing the resource. Additionally, or alternatively, user device 205 may be capable of receiving information from and/or transmitting information to one or more other devices in environment 200.

Base station 210 may include one or more devices capable of transferring traffic, such as audio, video, text, and/or other traffic, destined for and/or received from user device 205. In some implementations, base station 210 may include an eNB associated with the LTE network that receives traffic from and/or sends traffic to network 245 via SGW 220 and/or PGW 225. Additionally, or alternatively, one or more base stations 210 may be associated with a RAN that is not associated with the LTE network. Base station 210 may send traffic to and/or receive traffic from user device 205 via an air interface. In some implementations, base station 210 may include a small cell base station, such as a base station of a microcell, a picocell, and/or a femtocell.

MME 215 may include one or more devices, such as one or more server devices, capable of managing authentication, activation, deactivation, and mobility functions associated with user device 205. In some implementations, MME 215 may perform operations relating to authentication of user device 205. Additionally, or alternatively, MME 215 may facilitate the selection of a particular SGW 220 and/or a particular PGW 225 to serve traffic to and/or from user device 205. MME 215 may perform operations associated with handing off user device 205 from a first base station 210 to a second base station 210 when user device 205 is transitioning from a first cell associated with the first base station 210 to a second cell associated with the second base station 210. Additionally, or alternatively, MME 215 may select another MME (not pictured), to which user device 205 should be handed off (e.g., when user device 205 moves out of range of MME 215).

SGW 220 may include one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 245 (e.g., via PGW 225) and/or other network devices associated with the EPC and/or the IMS core. SGW 220 may also receive traffic from network 245 and/or other network devices, and may send the received traffic to user device 205 via base station 210. Additionally, or alternatively, SGW 220 may perform operations associated with handing off user device 205 to and/or from an LTE network.

PGW 225 may include one or more devices capable of providing connectivity for user device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 245. Additionally, or alternatively, PGW 225 may receive traffic from network 245, and may send the traffic to user device 205 via SGW 220 and base station 210.

Service control device 230 may include one or more devices, such as one or more server devices, associated with receiving, generating, determining, providing, and/or storing information associated with a service rule that identifies one or more services that are to be applied to packets associated with server device 255 and/or an application layer identifier. In some implementations, service control device 230 may be capable of capturing and/or snooping a packet (e.g., a DNS response packet) in order to determine a network address that corresponds to server device 255. Additionally, or alternatively, service control device 230 may be capable of determining network address information included in a connection control packet, associated with user device 205, and determining an application layer identifier that corresponds to the network address.

Additionally, or alternatively, service control device 230 may be capable of determining a service rule, associated with an application layer identifier, that identifies a service that is to be applied to a packet, and providing the packet to service device 240 to allow the service to be applied to the packet. In some implementations, service control device 230 may implement a policy and charging enforcement function (PCEF) that enforces policy decisions received from PCRF 235. In some implementations, service control device 230 may be included in PGW 225.

PCRF 235 may include a device, such as a server, capable of determining and/or enforcing policy rules. In some implementations, PCRF 235 may establish service rules for a connection (e.g., between user device 205 and server device 255) on a per user basis, a per user device 205 basis, a per application layer identifier basis, a per application group basis, a per network address basis, a per server device 255 basis, or the like. In some implementations, PCRF 235 may receive input regarding users, user devices 205, resources, server devices 255, or the like, may create quality of service and charging policy rules for a connection, and may provide the policy rules to service control device 230, which may handle packets for the connection based on the policy rules. In some implementations, PCRF 235 and service control device 230 could be implemented as a single device or a single collection of devices.

Service device 240 may include a device capable of receiving packets, associated with a connection, applying a service to the packets, and providing the serviced packets.

For example, service device 240 may include a server device, a group of server devices, a gateway, a router, a modem, a switch, cloud devices, and/or another similar type of device. In some implementations, service device 240 may be capable of applying a service to packets received by service device 240, such as a video caching service, a web caching service, a firewall service, a network address NAT service, a TCP optimization service, an ad insertion service, a parental control service, a web optimization service, a video optimization service, or another type of service. In some implementations, service device 240 may be implemented in SGW 220 and/or PGW 225.

Network 245 may include one or more packet data networks external to the LTE, EPC, and/or the IMS core. For example, network 245 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

DNS server 250 may include a one or more devices, such as one or more server devices, capable of providing a response to a query of a directory including one or more application layer identifiers identifying server devices 255. For example, DNS server 250 may include a device capable of determining, storing, receiving, and/or sending information that identifies a network address (e.g., an IP address), associated with a resource (e.g., a website, a program, a file, a document, etc.), based on an application layer identifier (e.g., a web address, a URL, a URI, etc.). While DNS server 250 is shown as being external to the EPC, the IMS core, and network 245, in some implementations, DNS server 250 may be included in the EPC, the IMS core, and/or network 245.

Server device 255 may include a device, such as a server device or a collection of server devices, that hosts a resource that may be accessed by user device 205. In some implementations, server device 255 may be identified using a network address, such an IP address. In some implementations, server device 255 may be capable of receiving and/or providing packets via a connection between server device 255 and user device 205, such that user device 205 may access the resource hosted by server device 255.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
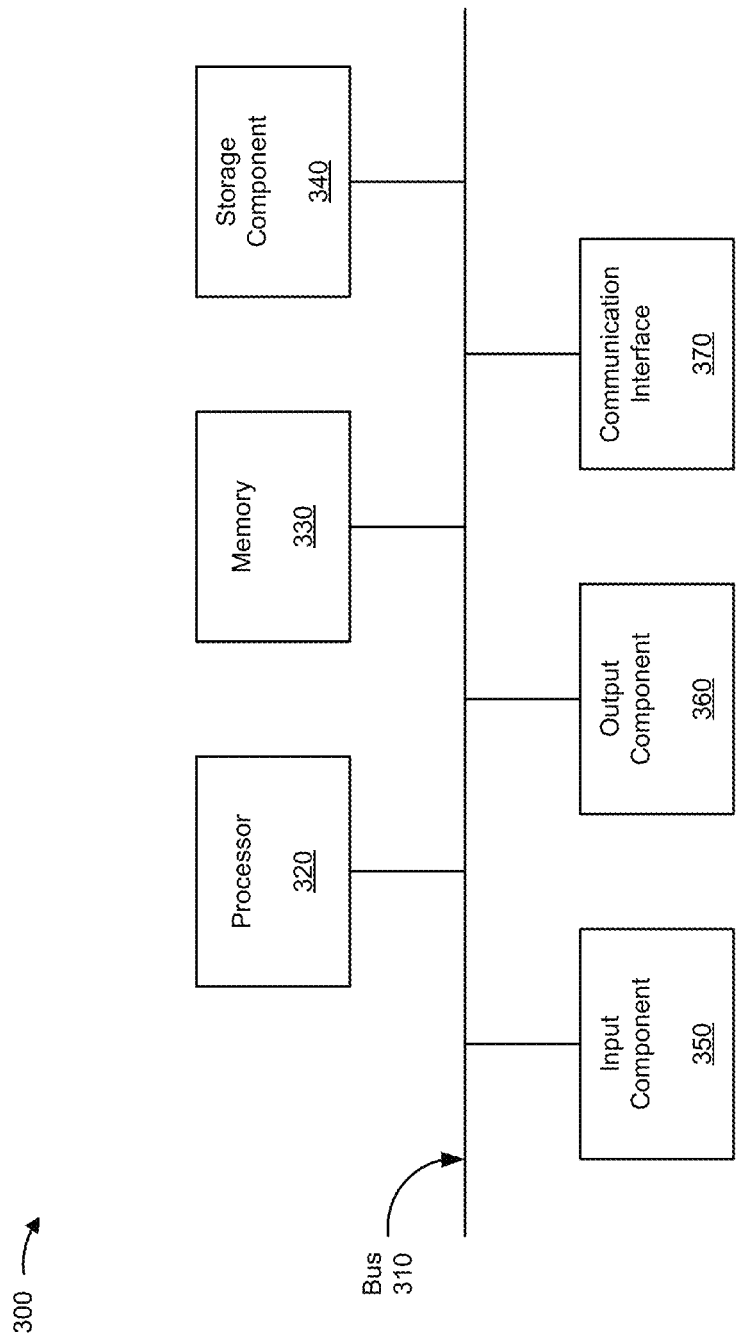
FIG. 3 is a diagram of example components of one or more devices of FIG. 2.

FIG. 3 is a diagram of example components of a device 300. Device 300 may correspond to user device 205, base station 210, MME 215, SGW 220, PGW 225, service control device 230, PCRF 235, service device 240, DNS server 250, and/or server device 255. In some implementations, user device 205, base station 210, MME 215, SGW 220, PGW 225, service control device 230, PCRF 235, service device 240, DNS server 250, and/or server device 255 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
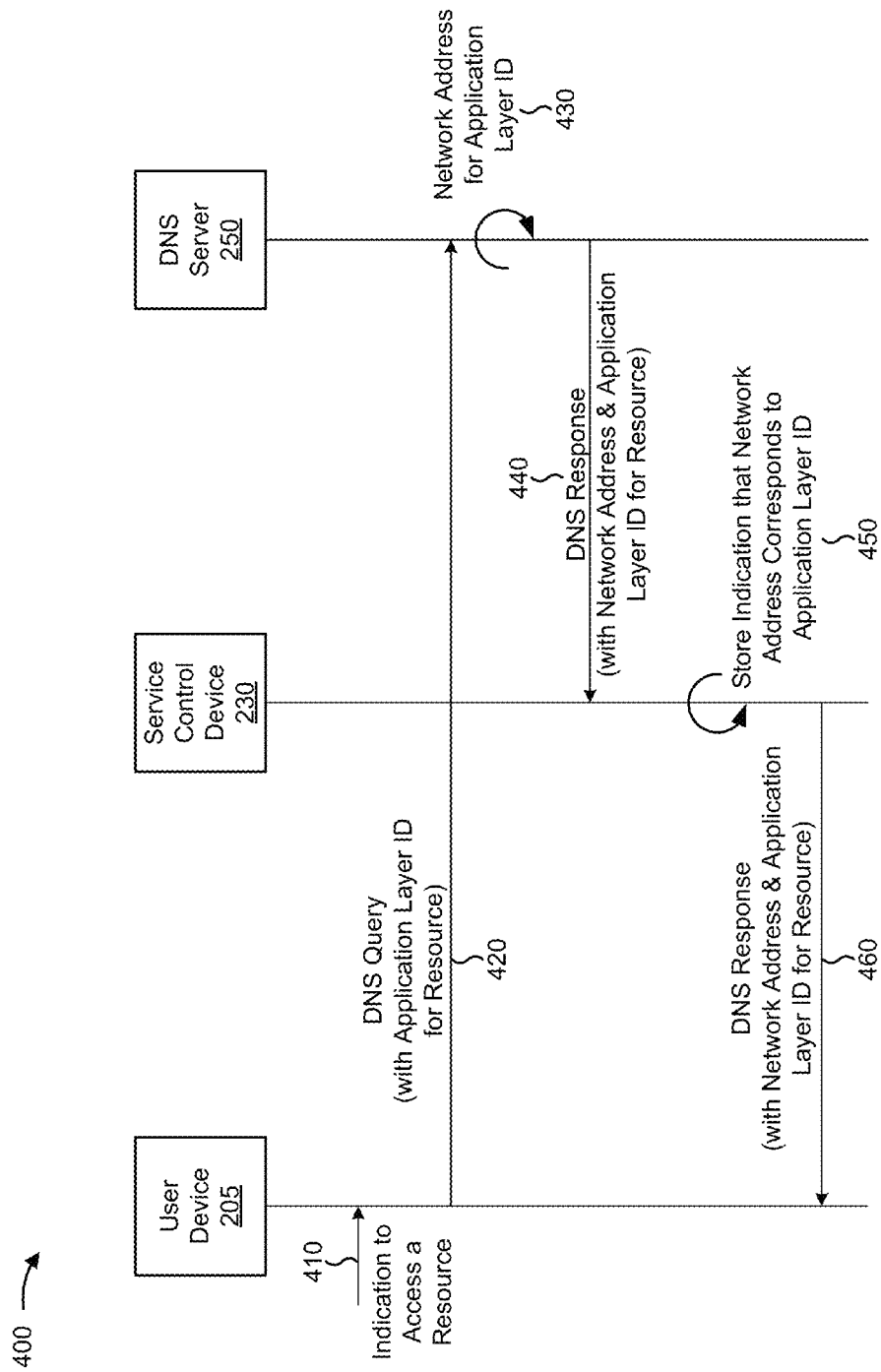
FIG. 4 is a call flow diagram of an example process for determining a network address that corresponds to an application layer identifier associated with a resource.

FIG. 4 is call flow diagram of an example process 400 for determining a network address that corresponds to an application layer identifier associated with a resource. In some implementations, one or more operations of FIG. 4 may be performed by one or more devices included in environment 200.

As shown in FIG. 4, process 400 may include receiving an indication to access a resource (shown at reference number 410). For example, user device 205 may receive an indication to access a resource. In some implementations, user device 205 may receive the indication when a user of user device 205 provides the indication. Additionally, or alternatively, user device 205 may receive the indication based on information provided by another device. Additionally, or alternatively, user device 205 may (e.g., automatically) receive the indication based on information stored by user device 205.

A resource may include data (e.g., in the form of a website, a program, a file, a document, or the like), hosted by server device 255, that may be accessed by user device 205. In some implementations, the resource may be identified (e.g., by the user) using an application layer identifier, such as a URL, a URI, a web address, or the like. In some implementations, user device 205 may receive the indication to access the resource based on user input. For example, a user may provide the indication by inputting (e.g., via a user interface displayed by user device 205) a URL, that identifies a website, into a web browser associated with user device 205. Additionally, or alternatively, user device 205 may receive the indication based on information stored by user device 205 (e.g., when user device 205 is configured to automatically access a program at a particular time of day, upon start-up, when a program is initiated, etc.).

As further shown in FIG. 4, process 400 may include providing a DNS query, associated with accessing the resource, that includes an application layer identifier associated with the resource (shown at reference number 420). For example, user device 205 may provide a DNS query, associated with accessing the resource, that includes an application layer identifier associated with the resource. In some implementations, user device 205 may provide the DNS query after user device 205 receives the indication to access the resource (e.g., after user device 205 receives the application layer identifier). Additionally, or alternatively, user device 205 may provide the DNS query after user device 205 generates the DNS query, as described below.

A DNS query may include a query of a directory (e.g., stored by DNS server 250) that includes a network address that identifies one or more server devices 255 that host a resource identified by an application layer identifier. In some implementations, the DNS query may include the application layer identifier (e.g., a URL, a URI, a web address, etc.) associated with the resource to be accessed by user device 205. For example, the DNS query may include a URL provided by a user via a web browser associated with user device 205. In some implementations, user device 205 may generate the DNS query, and may include the DNS query in a packet to be provided to DNS server 250. User device 205 may then provide the packet, via one or more other devices and/or networks, to DNS server 250.

As further shown in FIG. 4, process 400 may include determining a network address that corresponds to the resource identifier included in the DNS query (shown at reference number 430). For example, DNS server 250 may determine a network address that corresponds to the resource identifier included in the DNS query. In some implementations, DNS server 250 may determine the network address after user device 205 provides the DNS query. Additionally, or alternatively, DNS server 250 may determine the network address after DNS server 250 receives the DNS query.

In some implementations, DNS server 250 may determine the network address, associated with the resource, based on information stored by DNS server 250. For example, DNS server 250 may store information that identifies one or more network addresses that correspond to one or more resource identifiers. In this example, DNS server 250 may receive the application layer identifier (e.g., included in the DNS query), and may determine, based on the information stored by DNS server 250, a network address (e.g., an IP address) that identifies server device 255 that hosts the resource identified by the application layer identifier. In some implementations, DNS server 250 may determine multiple network addresses that correspond to the resource identifier included in the DNS query (e.g., when multiple server devices 255 may be used to access the resource), and may select one or more network addresses, of the multiple network addresses, to be provided to user device 205.

As further shown in FIG. 4, process 400 may include providing a DNS response that includes the network address and the application layer identifier (shown at reference number 440). For example, DNS server 250 may provide a DNS response that includes the network address and the application layer identifier. In some implementations, DNS server 250 may provide the DNS response after DNS server 250 determines the network address. Additionally, or alternatively, DNS server 250 may provide the DNS response after DNS server 250 generates the DNS response, as described below.

A DNS response may include a response to a DNS query that includes a network address identifying server device 255 that hosts a resource identified by an application layer identifier included in a DNS query. In some implementations, the DNS response may include the application layer identifier, the network address (e.g., determined by DNS server 250), and/or other information associated with responding to the DNS query. In some implementations, DNS server 250 may generate the DNS response, may include the DNS response in a packet, and may then provide the packet.

As further shown in FIG. 4, process 400 may include determining, based on the DNS response, that the network address corresponds to the application layer identifier (shown at reference number 450). For example, service control device 230 may determine, based on the DNS response, that the network address corresponds to the application layer identifier. In some implementations, service control device 230 may determine that the network address corresponds to the application layer identifier after DNS server 250 provides the DNS response. Additionally, or alternatively, service control device 230 may determine that the network address corresponds to the application layer identifier after service control device 230 captures and snoops the packet that includes the DNS response, as described below.

In some implementations, service control device 230 may determine that the network address corresponds to the application layer identifier based on receiving the DNS response. For example, DNS server 250 may provide the DNS response. Service control device 230 may receive the packet that includes the DNS response (e.g., when service control device 230 lies on a path between DNS server 250 and user device 205), may capture the packet (e.g., based on a configuration of service control device 230), and may snoop the packet in order to determine the network address and the application layer identifier included in the DNS response. Service control device 230 may then determine that the network address corresponds to the application layer identifier (e.g., since the network address and the application layer identifier are included in the DNS response, the information in the DNS response takes the form of the application layer identifier, or the like), and may store (e.g., in a memory location associated with service control device 230) information indicating that the network address corresponds to the application layer identifier.

As further shown in FIG. 4, process 400 may include providing the DNS response (shown at reference number 460). For example, service control device 230 may provide the DNS response. In some implementations, service control device 230 may provide the DNS response after service control device 230 determines that the network address corresponds to the application layer identifier. Additionally, or alternatively, service control device 230 may provide the DNS response after service control device 230 stores the information indicating that the network address corresponds to the application layer identifier.

In some implementations, service control device 230 may provide the DNS response (e.g., the packet including the DNS response) such that user device 205 may receive the DNS response. In some implementations, user device 205 may receive the response, and may attempt (e.g., based on the network address included in the DNS response) to establish of a connection (e.g., a TCP connection) with server device 255 in order to access the resource. Additional details regarding establishment of the connection, and applying one or more services to packets associated with the connection, are described below.

In this way, service control device 230 may dynamically associate an application layer identifier (e.g., a web address, a URL, a URI, etc.) with a network address (e.g., an IP address). In some implementations, service control device 230 may associate multiple application layer identifiers with multiple network addresses. This may allow service control device 230 to identify connection control packets, associated with a particular connection between user device 205 and server device 255, and redirect the connection control packets to service device 240 such that service device 240 may apply a service to data packets associated with the connection, as described below.

Although FIG. 4 shows example operations of process 400, in some implementations, process 400 may include additional operations, fewer operations, different operations, or differently arranged operations than those depicted in FIG. 4. Additionally, or alternatively, two or more of the operations of process 400 may be performed in parallel.

Figure 5:
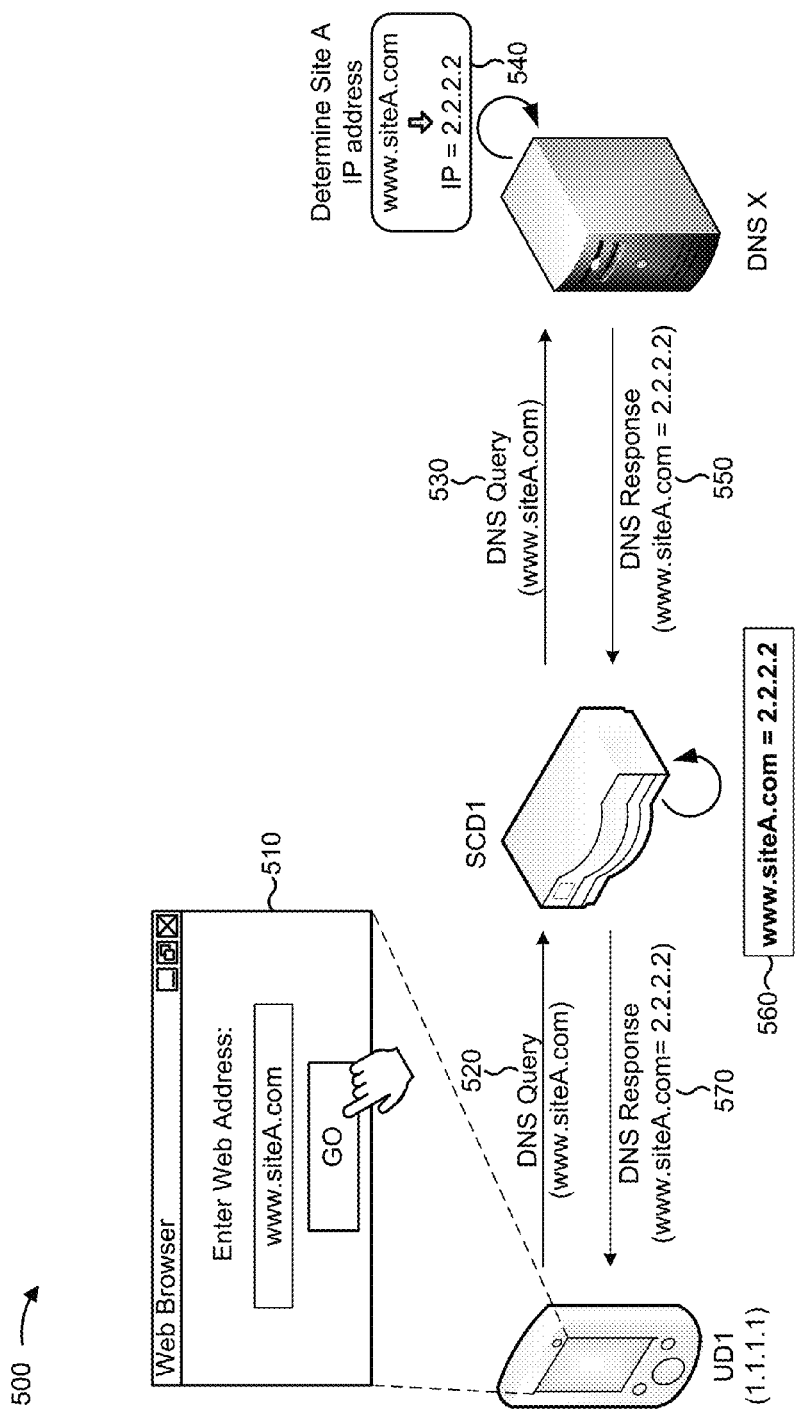
FIG. 5 is a diagram of an example implementation relating to the example process shown in FIG. 4.

FIG. 5 is a diagram of an example implementation 500 relating to example process 400 shown in FIG. 4. For the purposes of example implementation 500, assume that a user of user device 205 (e.g., UD1) wishes to view, via a web browser of UD1, a website (e.g., Site A) identified by a particular application layer identifier (e.g., www.siteA.com).

As shown in FIG. 5, and by reference number 510, the user may input (e.g., via an input box) the application layer identifier associated with Site A, and may indicate (e.g., by selecting a Go button) that UD1 is to access Site A. As shown by reference number 520, UD1 may generate and provide a DNS query that includes the application layer identifier. As shown by reference number 530, DNS server 250 (e.g., DNS X) may receive the DNS query. As shown by reference number 540, DNS X may determine (e.g., based on a directory stored or accessible by DNS X and based on the application layer identifier) a network address (e.g., IP=2.2.2.2) that identifies server device 255 that hosts Site A. As shown by reference number 550, DNS X may generate and provide a DNS response that includes information indicating that the application layer identifier corresponds to the network address (e.g., www.siteA.com=2.2.2.2).

As shown by reference number 560, service control device 230 (e.g., SCD1) may receive the DNS response (e.g., assume that SCD1 lies on a path between DNS X and UD1), may determine (e.g., based on capturing and snooping the DNS response) that the network address corresponds to the application layer identifier, and may store an indication that the network address corresponds to the application layer identifier. As shown by reference number 570, SCD1 may provide the DNS response to UD1.

As indicated above, FIG. 5 is provided merely as an example. Other examples are possible and may differ from what was described with regard to FIG. 5.

FIG. 6 is a flow chart of an example process 600 for matching a network address, included in a connection control packet, to an application layer identifier, identifying a service rule associated with the application layer identifier, and providing the connection control packet based on the service rule. In some implementations, one or more process blocks of FIG. 6 may be performed by service control device 230. In some implementations, one or more process blocks of FIG. 6 may be performed by another device or a group of devices separate from or including service control device 230, such as one or more other devices included in environment 200.

As shown in FIG. 6, process 600 may include receiving a connection control packet (block 610). For example, service control device 230 may receive a connection control packet. In some implementations, service control device 230 may receive the connection control packet when user device 205 provides the connection control packet. Additionally, or alternatively, service control device 230 may receive the connection control packet when the connection control packet is provided by another device, such as server device 255.

A connection control packet may include a packet associated with managing a connection between user device 205 and server device 255. For example, the connection control packet may be associated with establishing a TCP connection between user device 205 and server device 255. As another example, the connection control packet may be associated with terminating a connection between user device 205 and server device 255. Further, the connection control packet may not include application layer information associated with the connection. For example, the connection control packet may not include a URL, associated with a website that user device 205 is to access, when user device 205 sends a connection control packet associated with establishing a TCP connection for accessing the website.

In some implementations, user device 205 may provide the connection control packet. For example, user device 205 may receive a DNS response including a network address identifying server device 255 that hosts a resource that user device 205 is to access. In this example, user device 205 may receive the DNS response, and may provide a connection control packet, associated with establishing a TCP connection with server device 255, that includes the network address that identifies server device 255 (e.g., a destination network address), a network address that identifies user device 205 (e.g., a source network address), and/or other information associated with establishing the TCP connection. Additionally, or alternatively, the connection control packet may be provided by server device 255.

In some implementations, service control device 230 may receive the connection control packet based on a configuration of one or more network devices. For example, service control device 230 may lie on a path between user device 205 and server device 255 such that packets provided by user device 205 or server device 255 pass through service control device 230. Additionally, or alternatively, service control device 230 may receive the connection control packet when another device provides the connection control packet to service control device 230.

As further shown in FIG. 6, process 600 may include determining a network address included in the connection control packet (block 620). For example, service control device 230 may determine a network address included in the connection control packet. In some implementations, service control device 230 may determine the network address, included in the connection control packet, after service control device 230 receives the connection control packet.

A network address may include information that identifies a network device, such as an IP address or another type of device identifier that identifies the network device on a network. In some implementations, service control device 230 may determine the network address by inspecting the connection control packet. For example, service control device 230 may be configured to perform a shallow packet inspection (SPI) of packets passing through service control device 230. In this example, service control device 230 may receive the connection control packet, and may perform an SPI of the connection control packet by inspecting headers included in the connection control packet. Here, the network address may be included in an IP header of the connection control packet. Additionally, or alternatively, service control device 230 may determine the network address, included in the connection control packet, in another manner.

In some implementations, service control device 230 may determine multiple network addresses included in the connection control packet. For example, service control device 230 may determine a source network address and a destination network address included in the connection control packet. A source network address may include a network address that identifies a source of the connection control packet (e.g., an IP address of user device 205). A destination network address may include a network address that identifies a destination for the connection control packet (e.g., an IP address of server device 255).

As further shown in FIG. 6, process 600 may include matching the network address to an application layer identifier (block 630). For example, service control device 230 may match the network address to an application layer identifier. In some implementations, service control device 230 may match the network address to an application layer identifier after service control device 230 determines the network address in the connection control packet.

In some implementations, service control device 230 may match the network address to an application layer identifier based on information stored by service control device 230. For example, service control device 230 may store (e.g., based on capturing and snooping DNS responses provided by server devices 255) information identifying network addresses (e.g., IP addresses of server devices 255) that correspond to application layer identifiers (e.g., web addresses, URLs, URIs, etc.), as described above. In this example, service control device 230 may compare the network address, included in the connection control packet, to the stored information, and may match the network address to the application layer identifier.

In some implementations, service control device 230 may match a destination network address to the application layer identifier. For example, if user device 205 provides a first connection control packet, associated with establishing a connection with server device 255, then service control device 230 may match the destination network address (e.g., the IP address of server device 255) to an application layer identifier. Additionally, or alternatively, service control device 230 may match a source network address to the application layer identifier. Continuing with the above example, if server device 255 provides a second connection control packet, associated with establishing the connection with user device 205, then service control device 230 may match the source network address (e.g., the IP address of server device 255) to an application layer identifier. Additionally, or alternatively, service control device 230 may match a network address (e.g., a source network address or a destination network address) to user device 205.

As further shown in FIG. 6, process 600 may include identifying a service rule associated with the application layer identifier (block 640). For example, service control device 230 may identify a service rule associated with the application layer identifier. In some implementations, service control device 230 may identify the service rule after service control device 230 matches the network address to the application layer identifier.

A service rule may include information that identifies a service that is to be applied to data packets travelling via a connection associated with an application layer identifier. A service may include a manner in which packets (e.g., travelling via a connection between user device 205 and server device 255) are to be processed. For example, the service may include a video caching service, a web caching service, a firewall service, a NAT service, a TCP optimization service, an intrusion detection service, an ad insertion service, a parental control service, a web optimization service, a video optimization service, or another type of service.

In some implementations, the service rule may be associated with the application layer identifier. For example, the service rule may indicate that a video caching service is to be applied to data packets sent to, or received from, server device 255 that hosts a resource identified by a particular application layer identifier (e.g., a video streaming website). Additionally, or alternatively, the service rule may be associated with a group of application identifiers that includes the application identifier. For example, the service rule may indicate that a TCP optimization service is to be applied to data packets associated with a group of application layer identifiers (e.g., a group of web addresses) that includes the application layer identifier. Additionally, or alternatively, the service rule may be associated with user device 205. For example, service control device 230 may store information indicating that a firewall service is to be applied to data packets associated with a connection between a particular user device 205 and any server device 255. In some implementations, the service may be configured by the service provider and/or may be associated with server device 255, a particular application layer identifier, a particular user device 205, a particular user, or the like. Additionally, or alternatively, the service rule may identify one or more services that are to be applied to packets associated with the application layer identifier.

In some implementations, service control device 230 may identify the service rule based on information stored or accessible by service control device 230. For example, service control device 230 may store information that identifies a group of service rules that correspond to a group of application layer identifiers, and service control device 230 may identify the service rule based on the stored information. Additionally, or alternatively, service control device 230 may identify the service rule based on receiving the service rule from PCRF 235. In some implementations, service control device 230 may identify a default service rule (e.g., a service rule to be applied when service control device 230 does not store information that identifies a service corresponding to a particular application layer identifier).

As further shown in FIG. 6, process 600 may include providing the connection control packet based on the service rule (block 650). For example, service control device 230 may provide the connection control packet based on the service rule. In some implementations, service control device 230 may provide the connection control packet after service control device 230 identifies the service rule. Additionally, or alternatively, service control device 230 may provide the connection control packet when service control device 230 receives an indication that service control device 230 is to provide the connection control packet.

In some implementations, service control device 230 may select service device 240 based on the service rule. For example, service control device 230 may identify a service rule indicating that a TCP optimization service is to be applied to data packets associated with a particular URL. In this example, service control device 230 may select (e.g., based on information stored or accessible by service control device 230, based on information received from another device) a particular service device 240 that is to apply the TCP optimization service. Here, service control device 230 may provide the connection control packet to service device 240. Service device 240 may receive the connection control packet, may process the connection control packet (e.g., such that service device 240 may apply the TCP optimization service to data packets travelling via the connection after the connection is established), and may forward the connection control packet (e.g., to server device 255) such that the connection may be established. In some implementations, service control device 230 may select multiple service devices 240 to process the data packets (e.g., in parallel, in series, etc.).

After the connection has been established (e.g., after service control device 230 has provided one or more connection control packets to service device 240), service control device 230 may provide data packets (e.g., associated with accessing the resource identified by the application layer identifier) to service device 240, and service device 240 may apply the service, accordingly.

In this way, service control device 230 may associate a connection control packet (e.g., that does not include an application layer identifier) with a corresponding application layer identifier. This may allow service control device 230 to provide the connection control packet to an appropriate service device 240 in accordance with a service rule associated with the application layer identifier. As such, service control device 230 may provide connection control packets, associated with different application layer identifiers, to one or more corresponding service devices 240 in accordance with one or more service rules.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
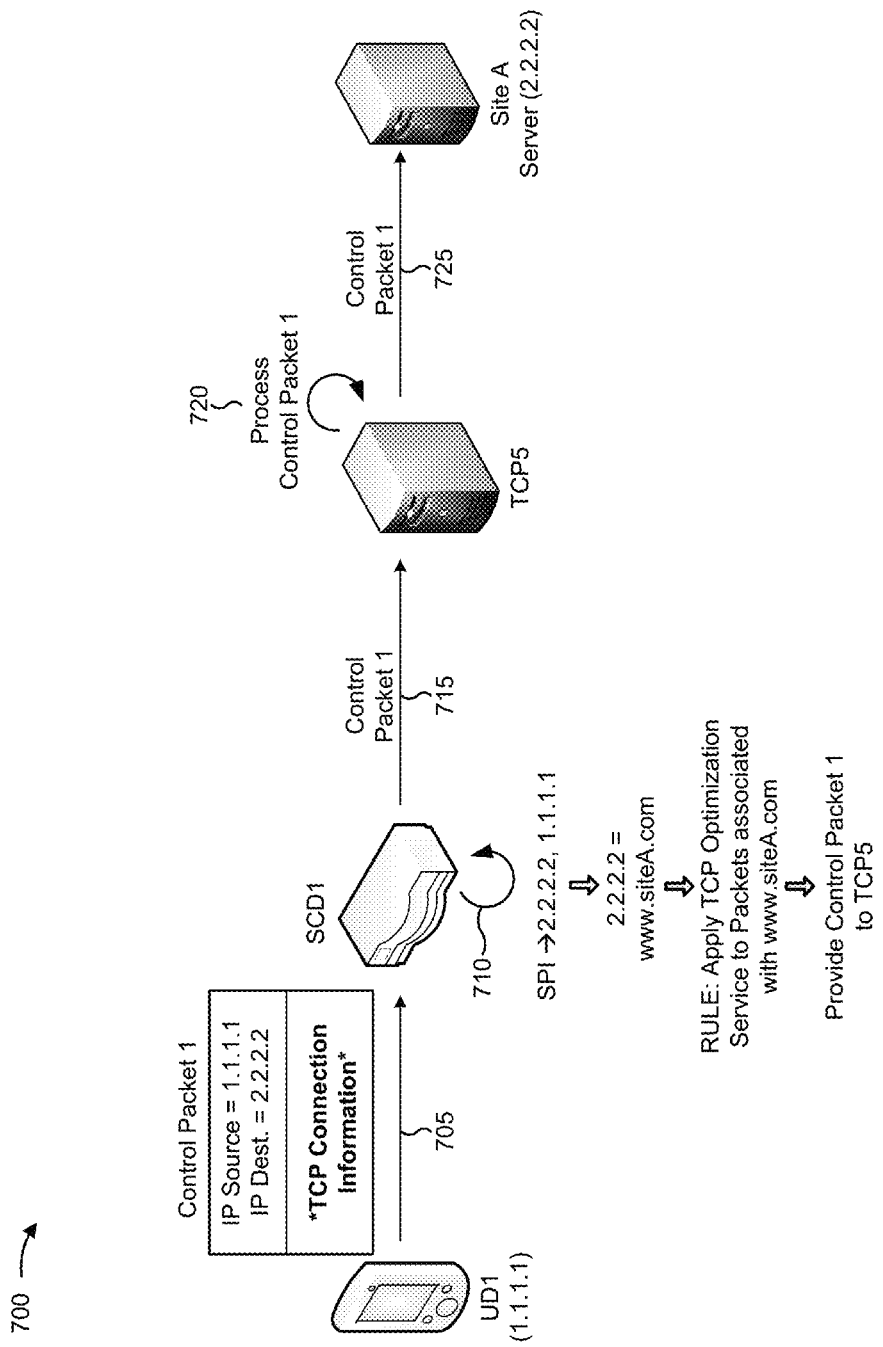
FIGS. 7A and 7B are diagrams of an example implementation relating to the example process shown in FIG. 6.
Figure 7B:
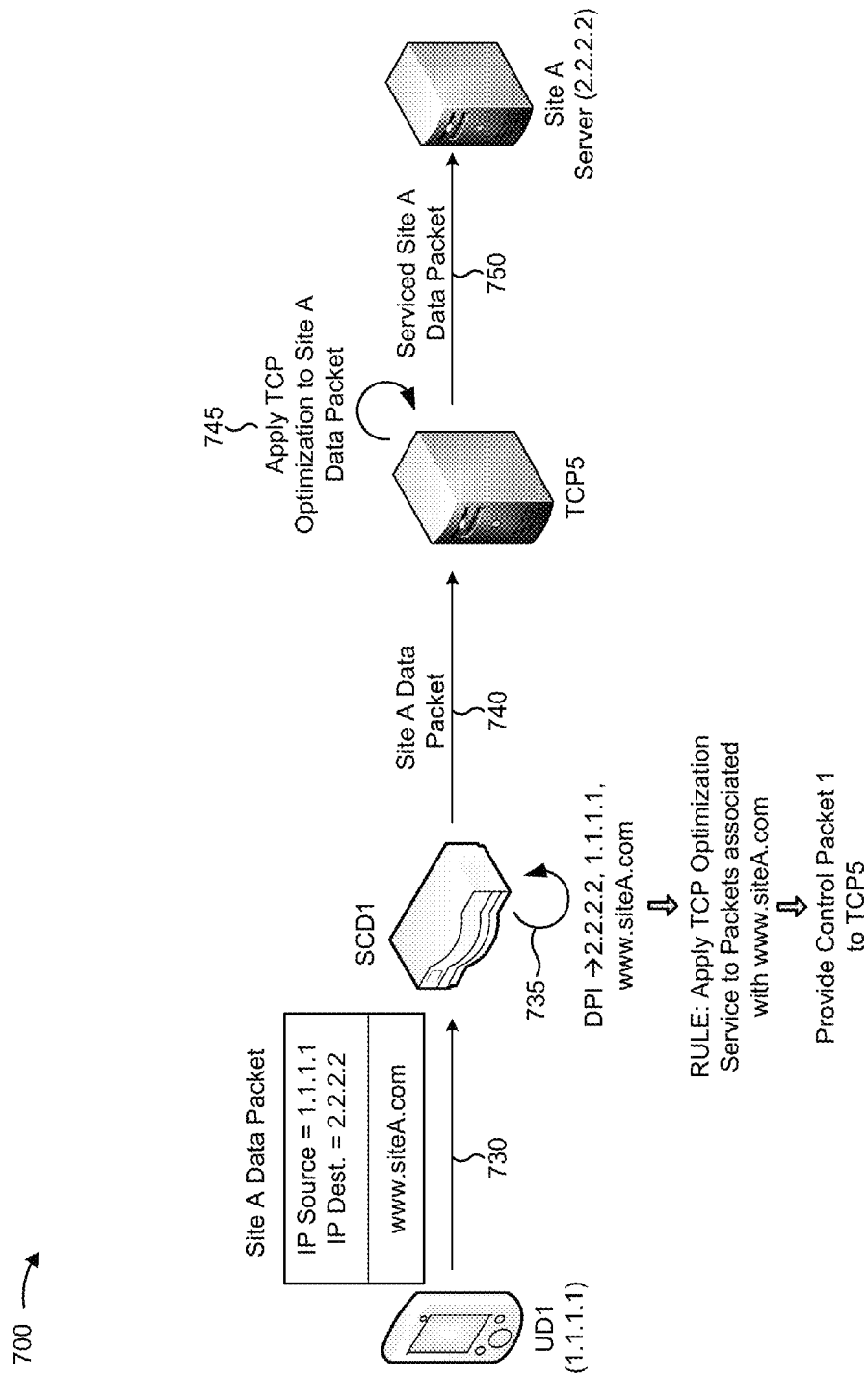

FIGS. 7A and 7B are diagrams of an example implementation 700 relating to example process 600 shown in FIG. 6. For the purposes of example implementation 700, assume that user device 205 (e.g., UD1) has determined (e.g., based on receiving a response to a DNS query) that a network address (e.g., 2.2.2.2), identifying a server device 255 (e.g., Site A server), corresponds to an application layer identifier (e.g., www.siteA.com). Further, assume that UD1 is to establish a TCP connection with the Site A server such that UD1 may access a website (e.g., corresponding to www.siteA.com) hosted by the Site A server. Finally, assume that service control device 230 (e.g., SCD1) stores information indicating that the application layer identifier corresponds to the network address (e.g., as shown above with regard to FIG. 5).

As shown in FIG. 7A, and by reference number 705, UD1 may generate and provide a connection control packet (e.g., control packet 1) associated with establishing the TCP connection with the Site A server. As shown, control packet 1 may include a source network address (e.g., IP Source=1.1.1.1) associated with UD1, a destination network address (e.g., IP Dest.=2.2.2.2) associated with the Site A server, and connection information associated with establishing the TCP connection. Notably, control packet 1 does not include the application layer identifier associated with Site A.

As shown by reference number 710, SCD1 may receive control packet 1, and may determine a source network address and a destination network address included in control packet 1 (e.g., SPI→ 1.1.1.1, 2.2.2.2) based on performing an SPI of control packet 1. As shown, SCD1 may determine (e.g., based on the information stored by SCD1), that the destination address (e.g., 2.2.2.2) corresponds to the www.siteA.com application layer identifier. As further shown, SCD1 may determine (e.g., based on information stored by SCD1, based on information received from PCRF 235) that a TCP optimization service is to be applied to data packets associated with a TCP connection involving any server device 255 associated with www.siteA.com. As further shown, SCD1 may identify a particular service device 240 (e.g., TCP5), associated with applying the TCP optimization service, to which control packet 1 is to be provided.

As shown by reference number 715, SCD1 may provide control packet 1 to TCP5. For the purposes of example implementation 700, assume SCD1 identifies 1.1.1.1 as being associated with UD1, and that there are no service rules specific to UD1.

As shown by reference number 720, TCP5 may receive control packet 1, and may process control packet 1 such that TCP5 may apply the TCP optimization service to data packets associated with the TCP connection (e.g., without processing control packet 1 TCP5 may be unable to apply the TCP optimization service). As shown by reference number 725, after processing control packet 1, TCP5 may provide control packet 1 to the Site A server.

For the purposes of FIG. 7B, assume that SCD1 has provided one or more other connection control packets to TCP5 (e.g., in the manner described above), and that a TCP connection has been established between UD1 and the Site A server. In other words, assume that TCP5 has received and processed all connection control packets associated with establishing the TCP connection.

As shown in FIG. 7B, and by reference number 730, UD1 may provide a data packet, associated with Site A. As shown by reference number 735, SCD1 may receive the data packet, may determine (e.g., based on performing a deep packet inspection (DPI)) a source network address, a destination network address, and an application layer identifier included in the data packet (e.g., DPI→ 1.1.1.1, 2.2.2.2, www.siteA.com). As further shown, SCD1 may determine, based on the application layer identifier included in the data packet, that the TCP optimization service is to be applied to packets associated with a TCP connection involving any server device 255 associated with www.siteA.com. As further shown, SCD1 may identify (e.g., based on the source network address, the destination network address, and/or other information included in the data packet) the particular TCP connection (e.g., between UD1 and the Site A server), and may determine that TCP5 is to apply the TCP optimization service for the particular TCP connection. As shown by reference number 740, SCD1 may provide the data packet to TCP5.

As shown by reference number 745, TCP5 may receive the data packet, may apply the TPC optimization service to the data packet and, as shown by reference number 750, may provide the serviced data packet to the Site A server. This process may be repeated for other data packets associated with the TCP connection such that the TCP optimization service is applied to all data packets associated with the TCP connection between UD1 and the Site A server.

As indicated above, FIGS. 7A and 7B are provided merely as an example. Other examples are possible and may differ from what was described with regard to FIGS. 7A and 7B.

Implementations described herein may allow a service control device to determine a network address, included in a connection control packet associated with a connection, and match the network address to a corresponding application layer identifier. This may allow the service control device to provide the connection control packet to a service device associated with applying a service to data packets associated with the connection.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

As used herein, a packet may refer to a network packet, a frame, a datagram, a segment, a fragment of a packet, a fragment of a frame, a fragment of a datagram, a fragment of a segment, or any other formatted or unformatted unit of data capable of being transmitted via a network.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
      receive a control packet associated with a connection, the control packet including an Internet Protocol (IP) address;
      receive a domain name system (DNS) response associated with a Uniform Resource Locator (URL), the DNS response including the IP address and the URL;
      determine information indicating that the IP address corresponds to the URL based on the DNS response;
      determine the URL is a match with the IP address based on determining the information indicating that the IP address corresponds to the URL;
      identify a service rule associated with the URL, the service rule identifying a first service and a second service to be applied to a data packet associated with the URL;
      identify a first service device associated with applying the first service;
      identify a second service device associated with applying the second service; and
      provide the control packet to the first service device and the second service device based on identifying the service rule,
         the control packet being provided to the first service device to permit the first service to be applied to the data packet in accordance with the service rule, and
         the control packet being provided to the second service device to permit the second service to be applied to the data packet in accordance with the service rule.

2. The device of claim 1, where the control packet is a transmission control protocol (TCP) control packet associated with establishing a TCP connection.

3. The device of claim 1, where the one or more processors are further to:
   receive the data packet,
      the data packet including the URL; and provide the data packet to cause the first service to be applied to the data packet in accordance with the service rule.

4. A non-transitory computer-readable medium storing instructions, the instructions comprising:
one or more instructions that, when executed by one or more processors, cause the one or more processors to:
receive a control packet associated with a connection between a first device and a second device;
determine a network address included in the control packet,
the network address identifying the second device;
receive a domain name system (DNS) response associated with an application layer identifier,
the DNS response including the network address and the application layer identifier;
determine information indicating that the network address corresponds to the application layer identifier based on the DNS response;
match the network address to the application layer identifier based on the information indicating that the network address corresponds to the application layer identifier;
identify a service rule, associated with the application layer identifier, based on matching the network address to the application layer identifier,
the service rule identifying a first service and a second service to be applied to a data packet travelling via the connection between the first device and the second device;
identify a first service device associated with applying the first service;
identify a second service device associated with applying the second service; and
provide the control packet based on identifying the service rule,
the control packet being provided to the first service device to allow the first service to be applied to the data packet in accordance with the service rule, and
the control packet being provided to the second service device to allow the second service to be applied to the data packet in accordance with the service rule.

5. The non-transitory computer-readable medium of claim 4, where the control packet is a transmission control protocol (TCP) control packet and the connection is a TCP connection.

6. The non-transitory computer-readable medium of claim 4, where the one or more instructions, when executed by the one or more processors, further cause the one or more processors to:
store information associated with the network address and the application layer identifier in memory; and
where the one or more instructions, that cause the one or more processors to match the network address to the application layer identifier, cause the one or more processors to:
match the network address to the application layer identifier based on looking up the stored information in memory.

7. The non-transitory computer-readable medium of claim 4, where the one or more instructions, when executed by the one or more processors, further cause the one or more processors to:
receive the data packet,
the data packet including the application layer identifier; and
provide the data packet to cause the first service to be applied to the data packet in accordance with the service rule.

8. A method, comprising:
receiving, by a device, a control packet associated with a connection,
the control packet including a network address;
receiving, by the device, a domain name system (DNS) response associated with an application layer identifier,
the DNS response including the network address and the application layer identifier;
determining, by the device, that the application layer identifier is associated with the network address based on the DNS response associated with the application layer identifier;
identifying, by the device and based on determining the application layer identifier is associated with the network address, a service rule associated with the application layer identifier,
the service rule indicating a manner in which a data packet, associated with the application layer identifier, is to be processed;
identifying, by the device, a first service device associated with applying a first service;
identifying, by the device, a second service device associated with applying a second service; and
providing, by the device, the control packet based on identifying the service rule,
the control packet being provided to the first service device to allow the first service to be applied to the data packet, associated with the connection, in accordance with the service rule, and
the control packet being provided to the second service device to allow the second service to be applied to the data packet, associated with the connection, in accordance with the service rule.

9. The method of claim 8, where the control packet is a transmission control protocol (TCP) control packet and the connection is a TCP connection.

10. The method of claim 8, further comprising:
receiving a plurality of data packets associated with the connection; and
providing the plurality of data packets to the first service device for servicing in accordance with the service rule.

11. The method of claim 8, further comprising:
receiving the data packet,
the data packet including the application layer identifier; and
providing the data packet such that the second service is applied to the data packet.

12. The device of claim 1, where the first service includes at least one of:
a video caching service,
a web caching service,
a firewall service,
a NAT service,
a TCP optimization service,
an intrusion detection service,
an ad insertion service,
a parental control service,
a web optimization service, or
a video optimization service.

13. The device of claim 1, where the one or more processors are further to:

provide the DNS response to a user device based on determining the URL is a match with the IP address.

14. The non-transitory computer-readable medium of claim 4, where the one or more instructions, when receiving the data packet, cause the one or more processors to:
   receive the data packet from the first device; and
   where the one or more instructions, when providing the data packet, cause the one or more processors to:
      provide the data packet towards the second device.

15. The method of claim 8, further comprising:
   storing an indication that the application layer identifier is associated with the network address based on determining the application layer identifier is associated with the network address.

16. The device of claim 1, where the one or more processors are further to:
   determine a source network address and a destination network address based on receiving the control packet.

17. The device of claim 1, where the one or more processors, when determining the URL is a match with the IP address, are to:
   determine the URL is a match with a destination network address.

18. The non-transitory computer-readable medium of claim 4, where the one or more instructions, when executed by the one or more processors, further cause the one or more processors to:
   store information that identifies a group of service rules associated with a group of application layer identifiers; and
   where the one or more instructions, that cause the one or more processors to identify the service rule associated with the application layer identifier, cause the one or more processors to:
      identify the service rule based on the stored information.

19. The method of claim 10, where the plurality of data packets are serviced in parallel or in series.

20. The method of claim 8, further comprising:
   selecting, by the device, the first service device to apply the first service based on the service rule; and
   where providing the control packet to the first service device includes:
      providing the control packet to the first service device to allow the first service to be applied to the data packet based on selecting the first service device to apply the first service.

* * * * *